Dec. 8, 1931.  R. I. BATES  1,835,110

DOUBLE ACTING VALVE FOR SHOCK ABSORBERS

Filed June 7, 1927

Ralph I. Bates Inventor

By Spencer, Hardman and Fehr
his Attorneys

Patented Dec. 8, 1931

1,835,110

UNITED STATES PATENT OFFICE

RALPH IRWIN BATES, OF DAYTON, OHIO, ASSIGNOR, BY MESNE ASSIGNMENTS, TO DELCO PRODUCTS CORPORATION, OF DAYTON, OHIO, A CORPORATION OF DELAWARE

DOUBLE ACTING VALVE FOR SHOCK ABSORBERS

Application filed June 7, 1927. Serial No. 197,185.

This invention relates to improvements in rebound checks particularly adapted for use on automotive and other vehicles which have a frame or body supported by springs upon the road wheel axles.

It is among the objects of the present invention to provide a smooth operating rebound check of simple structure and design, which will permit vehicle springs to function as shock absorber elements when the road bed upon which the vehicle is operated is comparatively smooth, said rebound check, however, controlling the action of the vehicle springs when it is being operated over a substantially rougher road bed.

Further objects and advantages of the present invention will be apparent from the following description, reference being had to the accompanying drawings wherein a preferred embodiment of one form of the present invention is clearly shown.

Figure 1:
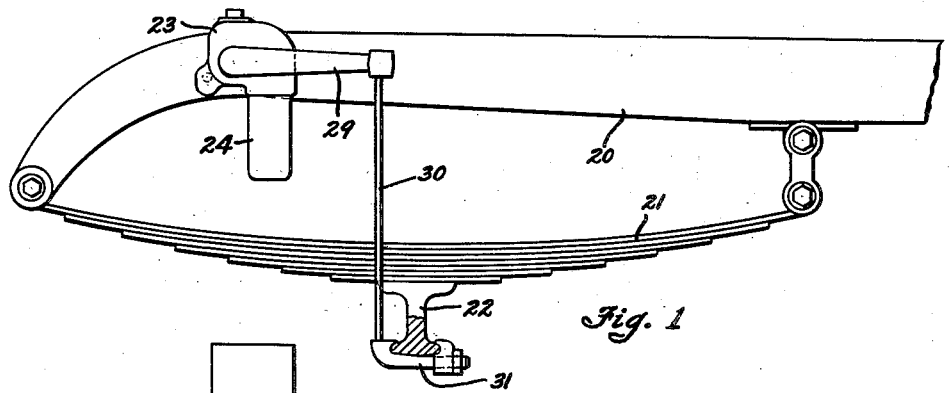
Fig. 1 is a diagrammatic fragmentary side view showing the vehicle frame and axle and a form of the present invention applied thereto.
Figure 2:
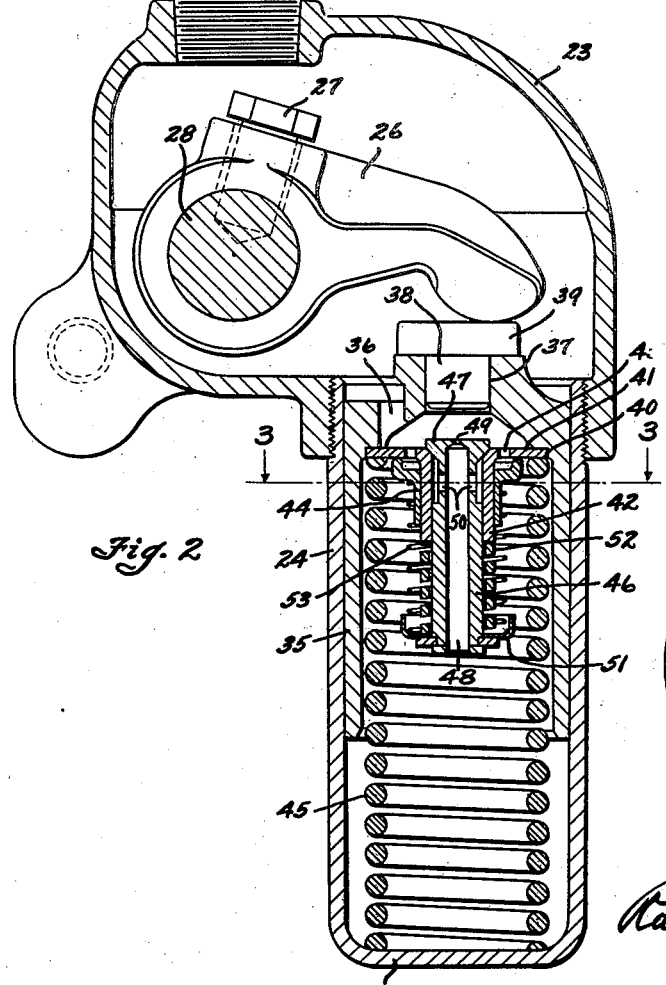
Fig. 2 is a longitudinal sectional view of the rebound check.
Figure 3:
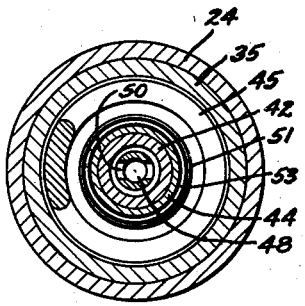
Fig. 3 is a transverse sectional view taken along the line 3—3 of Fig. 2.

Referring to the drawings, and more particularly to the Fig. 1 thereof, the numeral 20 designates the frame member of the vehicle which is supported by springs, one of which is shown at 21. The spring is mounted upon an axle 22 to which is secured a clamping bracket 31.

The shock absorber or rebound check includes a bracketed casing 23 providing a fluid reservoir to which is attached one end of the cylinder 24 so as to communicate with said reservoir, the other end of the cylinder being closed as at 25. The bracketed casing 23 is attached in any suitable manner either to the axle 22 or the frame 20, the present drawings illustrating said casing as secured to the frame. Within the casing 23 there is housed an oscillatable lever arm 26 secured by means of screws 27 to a shaft 28 one end of which extends outside the casing. The outside of said shaft has a lever arm 29 secured thereto, the free end of which is connected to the clamping member 31 by means of a strap or cable 30.

Within the cylinder 24 there is reciprocally supported a piston 35 of the cup shaped type having a head portion adjacent the casing 23, said head portion being provided with a fluid passage 36. A central aperture 37 in the piston head has a plug 38 fitting therein which plug is provided with a head 39 adapted to be engaged by the free end of the lever 26 to move the piston downwardly into the cylinder. The inside surface of the piston head is counterbored to receive the flange portion 40 of the valve seat member 41, which member is provided with a sleeve-like extending portion 42 coaxial with the cylinder 24. A plurality of apertures 43 are provided in the flange portion 40 forming fluid passages which provide comunication between the fluid passage 36 in the piston head and the interior of the cylinder 24. A cup shaped valve 44 slidably fits about the sleeve-like portion 42 of the valve seat member, the larger diameter edge of said valve engaging the lower surface of the valve seat member 41 to encompass all of the apertures 43 and thus shut off communication between the passage 36 and the interior of the cylinder. A spring 45 has its one end resting upon the bottom 25 of the cylinder, the other end engages the valve seat member 41 to hold it in position in the counterbore portion of the piston head.

Within the sleeve-like portion 42 of the valve seat member 41 there is provided a plunger valve 46 having a head portion 47 which is adapted normally to engage the valve seat member 41. A longitudinal coaxial passage 48 is provided in the plunger valve, said passage having a restricted portion 49 providing a constant flow orifice at the head portion of the valve. An annular groove in the valve directly beneath the head portion 47 communicates with the passage 48 by means of transverse passages 50, this annular groove, however, being shut off normally from the piston head passage 36 due to the fact that the valve head 47 normally engages the valve seat 41, as has been mentioned. At the end of the valve opposite the head 47 a spring retainer cup 51 is secured. A spring 52 is interposed between the end of the sleeve portion 42 and the cup 51, said spring tending to hold the valve head 47 upon the valve seat member. Another spring 53 is interposed between the valve seat cup 51 and the slide valve 44 normally maintaining said slide valve in engagement with the valve seat member.

When the vehicle wheels strike an obstruction in the roadway the spring 21 will be flexed toward the vehicle body and the spring 45 will be permitted to move the piston toward the casing 23 thereby to rotate the lever 26 in a counter clockwise direction which will take up the slack in the cable 30. The fluid in the casing 23 will move the slide valve 44 off its seat and thus said fluid will pass through the piston passage 36 and passages 43 in the valve seat member 41 into the interior of the cylinder 24. The spring 21 now begins to return to its normal position while the vehicle body with its frame 20 has a tendency to rise, thus causing the lever arm 26 to be rotated in a clockwise direction in which it will exert a pressure upon the cap 39 to move the piston into the cylinder. Valve 44 will immediately close and for minor vehicle spring deflections the fluid will pass through the fixed orifice 49 without causing the shock absorber to interfere with the free movement of the vehicle springs. However, if the said spring deflection is of greater amplitude, the piston movement will cause pressure on the fluid in the cylinder to force the fluid through the passage 48 and the fixed orifice 49, while at the same time the plunger valve 46 will be moved upwardly in the sleeve 42 against the effect of spring 52 thus tending to move the head portion 47 of said valve away from the valve seat member 41. Under these last mentioned conditions a second passage is opened for the fluid flow which includes transverse passage 50 and the annular groove in the valve beneath the head portion 47; This will relieve oil pressure in the cylinder and permit the piston to be moved downwardly into the cylinder at a restricted rate, however, which will tend to check the rebound of the vehicle body and frame due to the reaction of the spring 21.

One advantage of the present invention resides in the fact that the valve structure within the piston is of a unitary nature, it being positioned to assemble the entire valve structure before it is placed within the piston. Any replacement of parts of the valve structure does not necessitate replacement of any other portion of the shock absorber.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing providing a fluid reservoir; a cylinder attached to and communicating with the casing; a piston in said cylinder, having a fluid passage; means for moving the piston in either direction in the cylinder; and a unitary structure secured in said piston, comprising an intermediate supporting member; valves slidably carried on said member, one of which is adapted to provide a substantially free flow of fluid through one portion of the intermediate supporting member and the piston passage when the piston is operated in the one direction, the other being adapted successively to provide divided passages for the decreasingly restricted flow of fluid to the piston passage in accordance with piston operation in the other direction.

2. A shock absorber comprising in combination, a casing providing a fluid reservoir; a cylinder attached to and communicating with the casing; a piston in said cylinder, having a fluid passage; means for moving the piston in either direction in the cylinder; and a unitary structure secured in said piston, comprising a flanged, tubular member slidably supporting valves on the outside and inside thereof, one of which provides a substantially free flow of fluid through the piston passage when the piston is operated in the one direction, the other having a constant flow orifice and a variable opening which successively provide divided passages for the decreasingly restricted flow of fluid through the piston passage in response to the piston operation in the other direction.

3. A shock absorber comprising in combination, a casing providing a fluid reservoir; a cylinder attached to and communicating with the casing; a piston in said cylinder, having a fluid passage; means for moving the piston in either direction in the cylinder; and a unitary structure secured in said piston, comprising a tubular member having an apertured flange, said tubular member slidably carrying valves, one of which is slidably carried on the outside of the tubular member and is adapted to provide a substantially free flow of fluid through the apertured flange of the tubular member in the piston passage when the piston is operated in one direction, the other a plunger valve slidably carried within the tubular member and having a constant flow orifice continually open and yieldably urged to close the tubular member, said plunger valve being adapted successively to provide divided passages for the decreasingly restricted flow of fluid through the piston in response to its movement in the other direction.

4. A shock absorber comprising in combination, a casing providing a fluid reservoir; a cylinder attached to and communicating with said casing; a piston in said cylinder, having a fluid passage; means for moving the piston in either direction in the cylinder; and a unitary valve structure supported within said piston, comprising, a tubular member having a flange engaged by one of the piston operating means, said flange having a plurality of openings into the piston passage; a spring pressed valve slidably carried upon the tubular member and normally closing the openings therein but adapted to open them when the piston moves in one direction, to provide for the substantially free flow of fluid through the flange and the piston passage, and a second spring pressed valve slidably carried within the tubular member, normally closing said member to prevent fluid flow therethrough, said second valve having also a continually open fluid passage provided with a constant flow orifice, whereby divided passages are provided successively to cause the fluid to flow through the piston passage at a decreasingly restricted rate when the piston is moved in the other direction.

5. A shock absorber comprising in combination; a casing providing a fluid reservoir; a cylinder attached to and communicating with the casing; a piston in said cylinder, having a head provided with a fluid passage; a valve seat member attached to the inside of the piston head and comprising a flange portion apertured to provide substantially free flow communication between the piston passage and the cylinder, said member also having a tubular extension coaxial with the cylinder; a valve slidably supported upon the outside of said extension, a plunger valve slidably supported in the sleeve-like extension, said plunger valve having a head portion normally held in engagement with the valve seat member and having an annular groove beneath the head portion normally forming a space within the sleeve-like extension and closed by said head portion, the said plunger valve having a coaxial longitudinal passage provided with a restricted end forming a constant flow orifice, the said passage communicating with the annular groove by means of cross passages; a spring-seat cup carried by the plunger valve; and springs interposed between the valves slidably mounted within and without the tubular extension and the spring seat cup normally holding the valves to close their respective passages.

In testimony whereof I hereto affix my signature.

RALPH IRWIN BATES.